United States Patent
Bossoli

(10) Patent No.: US 6,948,384 B2
(45) Date of Patent: Sep. 27, 2005

(54) COUPLER FOR TORQUE SENSOR

(75) Inventor: Jon W. Bossoli, Cheshire, CT (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 46 days.

(21) Appl. No.: 10/238,673

(22) Filed: Sep. 10, 2002

(65) Prior Publication Data

US 2004/0045374 A1 Mar. 11, 2004

(51) Int. Cl.⁷ .............................................. G01L 3/14
(52) U.S. Cl. .............................................. 73/862.333
(58) Field of Search ........................... 73/862–862.391; 280/771; 180/400

(56) References Cited

U.S. PATENT DOCUMENTS

| | | | | |
|---|---|---|---|---|
| 3,729,991 A | * | 5/1973 | Hardway, Jr. .......... | 73/862.337 |
| 4,899,598 A | * | 2/1990 | Gumaste et al. ....... | 73/862.335 |
| 5,195,383 A | * | 3/1993 | Tanaka et al. ......... | 73/862.325 |
| 6,402,196 B1 | * | 6/2002 | Nicot ......................... | 280/771 |
| 6,418,797 B1 | * | 7/2002 | Ambrosina et al. ...... | 73/862.29 |
| 6,517,113 B1 | * | 2/2003 | Nicot ......................... | 280/771 |
| 6,532,832 B2 | * | 3/2003 | Shahcheraghi et al. | 73/862.333 |
| 2003/0233889 A1 | * | 12/2003 | Nakane et al. ......... | 73/862.331 |

* cited by examiner

Primary Examiner—Max Noori
Assistant Examiner—Alandra Ellington

(57) ABSTRACT

A coupler acts as an interface between a torque element of a torque sensor and a shaft receiving an applied torque. A portion of the shaft is allowed to twist freely inside the element, and the coupler transfers a portion of the torsion forces in the shaft to the element. The element deforms and generates a magnetic field or other torque response corresponding to the applied torque in the shaft. The applied torque can then be determined based on a relationship between the torque in the shaft and the torque in the element. Reducing the torsion forces applied to the element allows the element to measure higher applied torques without permanently deforming.

12 Claims, 3 Drawing Sheets

COUPLER FOR TORQUE SENSOR

TECHNICAL FIELD

The present invention is directed to torque sensors, and more particularly to couplers for magnetoelastic torque sensors that measure torque in a shaft by monitoring changes in a magnetic field generated by a magnetoelastic element coupled to the shaft.

BACKGROUND OF THE INVENTION

Torque sensors known in the art rely on a magnetoelastic element attached to a component to sense torsion forces in the component. Deformation in the component caused by applied torque deforms the magnetoelastic element, resulting in a magnetic field that is proportional to the applied torque. A magnetometer disposed near the element detects the magnitude and polarity of the magnetic field, which indicates the magnitude and polarity of the applied torque.

To ensure that the deformation in the magnetoelastic element accurately reflects the torque applied to the shaft, the magnetoelastic element is usually a cylinder tightly coupled to the shaft. Depending on the material and process used to manufacture the magnetoelastic element, however, the applied torque may be so great that it causes irreversible changes in the element, permanently deforming it. For example, elements having a magnetoelastic coating applied to a substrate may be axially compressed before the coating is applied to optimize stresses in the coating. The substrate is ideally kept relatively thin in these types of elements, but minimizing substrate thickness also compromises the substrate's ability to handle larger applied torques.

If permanent deformation of the element occurs due to excessive applied torque, the sensor does not return to zero when the shaft is released from the applied torque. This change in the magnetoelastic element is called "zero-shift" because the zero point of the magnetic field generated by the element shifts due to the permanent deformation.

Current applications often place shafts in environments that allow the shaft to twist more than the magnetoelastic element is capable of handling without permanent deformation.

SUMMARY OF THE INVENTION

Accordingly, the present invention is directed to a coupler that acts as an interface between the magnetoelastic element and the shaft. A portion of the shaft is allowed to twist freely inside the element, and the coupler transfers a portion of the torsion forces in the shaft to the element. The element deforms and generates a magnetic field corresponding to the applied torque in the shaft, but the torque in the element is less than the applied torque in the shaft. The applied torque can then be determined based on a relationship between the torque in the shaft and the torque in the element. By reducing the torsion forces actually reaching the element, the element can be used to measure forces that would ordinarily cause permanent deformation in the element.

In one embodiment, a portion of the shaft has a reduced diameter to accommodate the coupler. The coupler is formed with an inner ring that accommodates the reduced diameter portion and an outer ring that fits inside the magnetoelastic element. The shaft portion having the original shaft diameter is attached to the element itself.

DETAILED DESCRIPTION OF THE EMBODIMENTS

Figure 1:
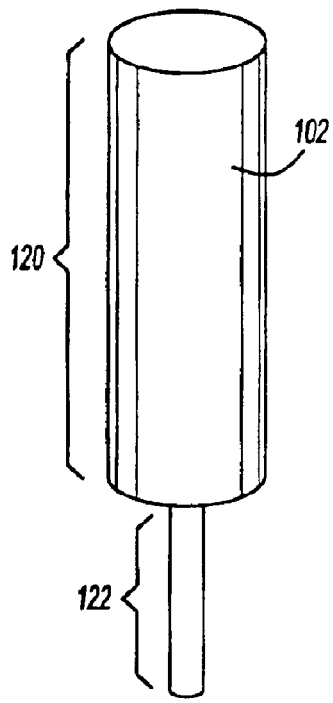
FIG. 1 is an exploded view of a shaft and torque sensor incorporating a coupler according to one embodiment of the invention.
Figure 1:
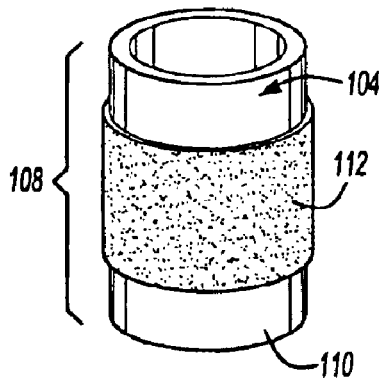
Figure 1:
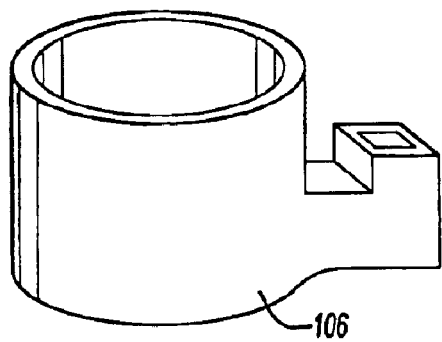
Figure 2:
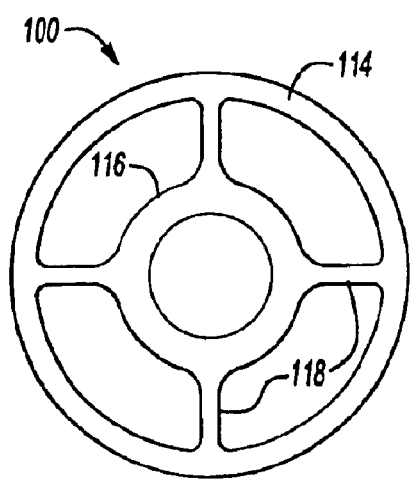
FIG. 2 is a plan view of the coupler according to one embodiment of the invention.
Figure 3:
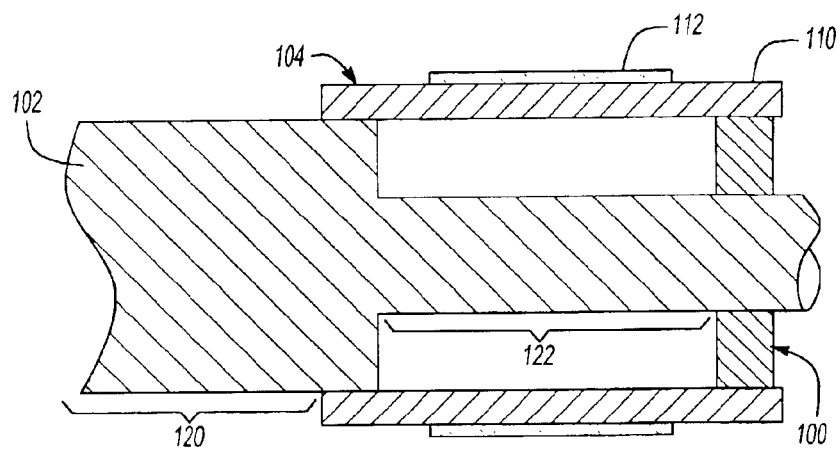
FIG. 3 is a side sectional view of the coupler in FIG. 1 attached to a shaft and magnetoelastic element.

Referring to FIGS. 1 through 3, the invention is directed a coupler 100 that couples a shaft 102 with a torque element, such as a magnetoelastic element 104. The magnetoelastic element 104 cooperates with a response detector, such as a magnetometer 106, to form a torque sensor 108. The magnetometer 106 measures changes in a magnetic field generated by the element 104 when it is deformed via torsion forces. Other torque elements and response detectors may be used to form the torque sensor as long as the torque element generates a torque response in response to an applied torque and the response detector is designed to detect the specific torque response generated by the torque element and generate a corresponding output. The element 104 may have any structure that allows it to deform in a predictable manner based on the applied torque on the shaft 102, such as a sleeve made of magnetic material or, as illustrated in the Figures, a deformable sleeve 110 with a magnetic coating 112 applied on it.

Rather than allowing the entire element 104 to contact the shaft 102 directly, the coupler 100 acts as an interface between the element 104 and the shaft 102. The coupler 100 prevents the element 104 from experiencing torsion forces that may cause permanent deformation and zero shift. In one embodiment, the coupler 100 has an outer ring 114 and an inner ring 116 that are connected together by spokes 118. The illustrated embodiment shows four spokes 118, but any number of spokes 118 can connect the outer and inner rings 114, 116. In this embodiment, the spokes 118 extend radially between the outer and inner rings 114, 116.

FIG. 3 is a sectional view of the shaft 102 having the magnetoelastic element 104 and coupler 100 attached. In the embodiment shown in FIGS. 1 through 3, the shaft 102 has one portion 120 with a large diameter and another portion 122 with a smaller diameter. The two different diameters allow the shaft 102 to accommodate the coupler 100. The smaller diameter portion 122 of the shaft 102 fits through the inner ring 116 of the coupler 100, while the larger diameter portion 120 fits through the element 104 itself. The coupler 100 should fit securely inside the element 104, such as via an interference fit. Ideally, the coupler 100 should not slip or move relative to the element 104; instead, the coupler 100 and the element 104 should move together as if they are a single piece.

The coupler 100 is attached to the smaller diameter portion 122 of the shaft 102 and the magnetoelastic element 104 is attached to the larger diameter portion 120 of the shaft 102. The shaft 102, coupler 100 and element 104 may be connected to each other via welding, interference fit, or any other method. The coupler 100 may also be attached to the middle of the shaft 102 rather than at the shaft's end. Regardless of how or where the coupler 100 attaches the element 104 to the shaft 102, the coupler 100 attenuates the torque applied to the shaft 102 so that the forces ultimately reaching the element 104 are smaller than those experienced by the shaft 102. More particularly, the smaller diameter portion 122 of the shaft 102 is allowed to twist inside the element 104 without directly twisting the element 104 itself. The coupler 100 transfers some, but not all, of the twisting forces in the shaft 102 to the element 104. In the embodiment shown in FIGS. 1 through 3, torsion forces in the smaller portion 122 of the shaft 102 are absorbed and are transferred to the element 104 in part through the radial spokes 118.

Figure 4:
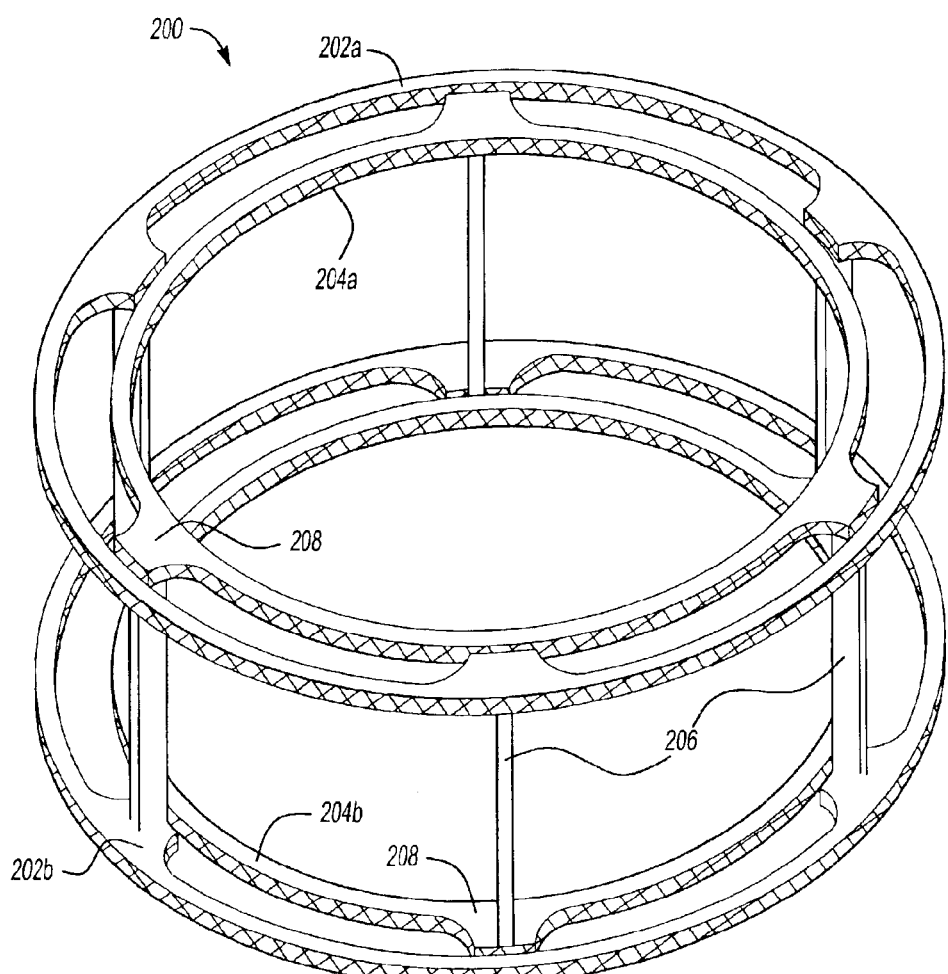
FIG. 4 is a perspective view of a coupler according to another embodiment of the invention.
Figure 5:
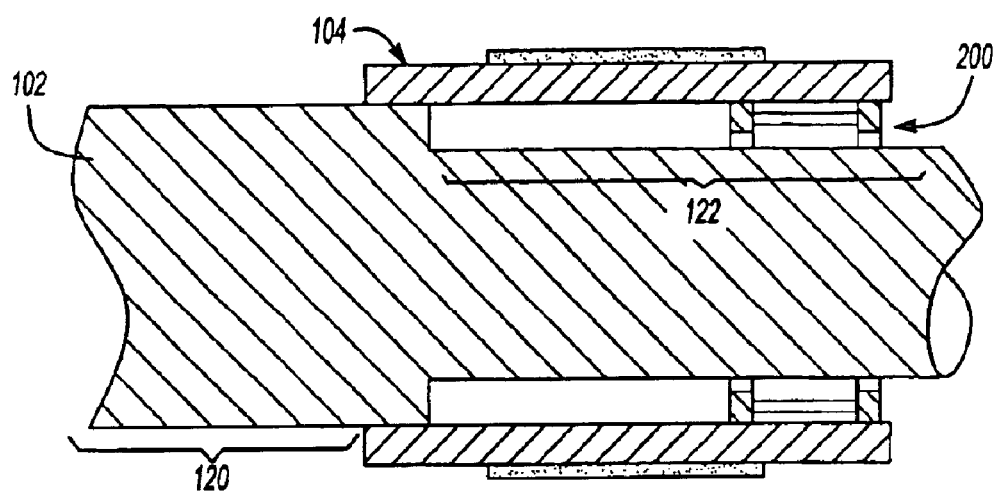
FIG. 5 is a side sectional view of the coupler in FIG. 3 attached to a shaft and magnetoelastic element.

The coupler 100 shown in FIGS. 1 through 3 reduces the torsion forces that reach the torsion forces that reach the element 104 via radially extending spokes 118. FIGS. 4 and 5 illustrate a coupler 200 according to another embodiment of the invention. The coupler 200 in this embodiment attaches a pair of outer rings 202a, 202b and a pair of inner rings 204a, 204b together via axial spokes 206 rather than radial spokes. Tabs 208 extending from the outer rings 202a, 202b and the inner rings 204a, 204b provide anchoring points for the axial spokes 206 while still allowing the inner rings 204a, 204b to twist independently of the outer rings 202a, 202b. As shown in FIG. 5, this structure can allow reduction of the diameter difference between the smaller diameter portion 122 and the larger diameter portion 120 of the shaft 102 and also reduces the length of the smaller diameter portion 122, preserving more of the original shaft dimensions.

The outer rings 202a, 202b are attached to the magnetoelastic element 104 and the inner rings 204a, 204b are attached to the shaft 102. As in the previous embodiment, the coupler 200 in this embodiment allows the smaller diameter portion 122 of the shaft 102 to twist more freely inside the element 104, causing the coupler 200 to absorb some of the torsion forces in the shaft 102 while transferring the remaining torsion forces to the element 104. As a result, the torsion forces experienced by the element 104 are lower than the torsion forces in the shaft 102.

Regardless of the spoke orientation, the coupler 100 acts as a spring member that absorbs some of the torsion forces in the shaft 102 before transferring the remaining forces to the element 104. In general, the coupler 100, 200 allows the element 104 to twist an amount proportional to the applied torque in the shaft 102. Preferably, the coupler 100, 200 is made of a resilient material with predictable deformation characteristics so that the relationship between the applied torque in the shaft 102 and the torque actually experienced by the element 104 can be calculated easily. Those of ordinary skill in the art would be able to determine, without undue experimentation, the relationship between the torsion forces in the element and the corresponding torsion forces in the shaft 102. Further, the dimensions of the spokes, the inner ring, and the outer ring can be varied to vary the relationship between the shaft torsion forces and the element torsion forces. The relationship can be, for example, determined empirically. In one embodiment, the magnetometer in the torque sensor (not shown) detects the torsion force experienced by the element 104 and calculates the applied torque from the measured torsion force.

By connecting the magnetoelastic element 104 to the shaft 102 via the coupler rather than directly onto the shaft 102, the element 104 is protected from torsion forces that would otherwise permanently change the element's magnetic characteristics. Further, the coupler avoids the need to thicken the walls of the element 104 to handle larger torsion forces, reducing the total amount of space occupied by the element 104. The coupler therefore expands the safe operating region of torque sensors and allows torque sensors to sense higher levels of applied torque in the shaft 102 without transferring those higher, and possibly damaging, higher torsion forces directly to the element 104 itself.

Note that although the embodiments shown above illustrate couplers 100 with spoked structures, the invention covers any compliant coupler structure. Further, the coupler 100 can be incorporated into any torque sensor where torque limitations within the sensor components are a concern, such as a strain gauge, etc., and is not limited to torque sensors using magnetometers.

It should be understood that various alternatives to the embodiments of the invention described herein may be employed in practicing the invention. It is intended that the following claims define the scope of the invention and that the method and apparatus within the scope of these claims and their equivalents be covered thereby.

We claim:

1. A torque sensor that senses a torsion force applied to a shaft, comprising:

a torque element connected to at least a portion of the shaft, wherein the torque element generates a torque response in response to the torsion force applied to the shaft;

a response detector in communication with the torque element, wherein the response detector senses the torque response and generates an output responsive to the torque response; and a coupler attached to the shaft and the torque element, wherein the coupler transfers a portion of the torsion force applied to the shaft to the torque element, wherein the coupler comprises a first inner ring coupled to the shaft, a first outer ring coupled to the torque element; and a plurality of spokes that extend axially between the first inner ring and the first outer ring for connecting the inner ring and the outer ring, and a second inner ring and a second outer ring wherein the second inner ring is connected to the first outer ring and the second outer ring is connected to first the inner ring via said plurality of spokes.

2. A torque sensor that senses a torsion force applied to a shaft, comprising:

a torque element connected to at least a portion of the shaft, wherein the torque element generates a torque response in response to the torsion force applied to the shaft;

a response detector in communication with the torque element, wherein the response detector senses the torque response and generates an output responsive to the torque response; and a coupler attached to the shaft and the torque element, wherein the coupler transfers a portion of the torsion force applied to the shaft to the torque element wherein the coupler comprises a first inner ring coupled to the shaft, a first outer ring coupled to the torque element; and a plurality of spokes connecting the inner ring and the outer ring, and wherein the shaft has a larger diameter portion corresponding to an inner diameter of the torque element and a smaller diameter portion corresponding to a diameter of the first inner ring.

3. The torque sensor of claim 2, wherein the torque element is a magnetoelastic element that generates a magnetic field as the torque response when deformed by the torsion force and the response detector is a magnetometer encircling at least a portion of the magnetoelastic element to sense the magnetic field.

4. The torque sensor of claim 2, wherein the plurality of spokes extends radially between the first inner ring and the first outer ring.

5. The torque sensor of claim 2, wherein the coupler is made of a resilient material.

6. A coupler for transferring a torsion force applied to a shaft to a torque element in a torque sensor, comprising:
   a first surface connected to the shaft;
   a second surface connected to the torque element; and
   a compliant portion connected to the first and second surfaces, wherein at least one of the first surface, second surface, and compliant portion transfers a portion of the torsion force applied to the shaft to the torque element.

7. The coupler of claim 6, wherein the first surface is a first inner ring, the second surface is a first outer ring, and the compliant portion is a plurality of spokes connecting the first inner ring and the first outer ring.

8. The coupler of claim 7, wherein the plurality of spokes extends radially between the first inner ring and the first outer ring.

9. The coupler of claim 7, wherein the plurality of spokes extends axially between the first inner ring and the first outer ring.

10. The coupler of claim 9, further comprising a second inner ring and a second outer ring, wherein the second inner ring is connected to the first outer ring and the second outer ring is connected to the first inner ring via said plurality of spokes.

11. A torque sensor that senses a torsion force applied to a shaft, comprising:
   a magnetoelastic element encircling at least a portion of the shaft, wherein the magnetoelastic element generates a magnetic field when deformed by the torsion force;
   a magnetometer encircling at least a portion of the magnetoelastic element, wherein the magnetometer senses the magnetic field and generates an output responsive to the magnetic field; and
   a coupler attached to the shaft and the magnetoelastic element, wherein the coupler transfers a portion of the torsion force applied to the shaft to the magnetoelastic element, and wherein the coupler comprises
      first and second inner rings,
      first and second outer rings, and
      a plurality of axially-extending spokes connecting the first inner ring to the second outer ring and connecting the first outer ring to the second inner ring.

12. The torque sensor of claim 11, wherein the shaft has a larger diameter portion corresponding to an inner diameter of the magnetoelastic element and a smaller diameter portion corresponding to a diameter of at least one of the first and second inner rings.

\* \* \* \* \*

UNITED STATES PATENT AND TRADEMARK OFFICE
CERTIFICATE OF CORRECTION

| | | |
|---|---|---|
| PATENT NO. | : 6,948,384 B2 | Page 1 of 1 |
| APPLICATION NO. | : 10/238673 | |
| DATED | : September 27, 2005 | |
| INVENTOR(S) | : Jon W. Bossoli and Dariusz Pszczola | |

It is certified that error appears in the above-identified patent and that said Letters Patent is hereby corrected as shown below:

<u>Title page,</u>
Item [75], Inventors, add -- Dariusz Pszczola --.

Signed and Sealed this

Twenty-fifth Day of July, 2006

JON W. DUDAS
*Director of the United States Patent and Trademark Office*